(No Model.)
M. F. CAPPS.
Liquid Cooler.
No. 236,982. Patented Jan. 25, 1881.
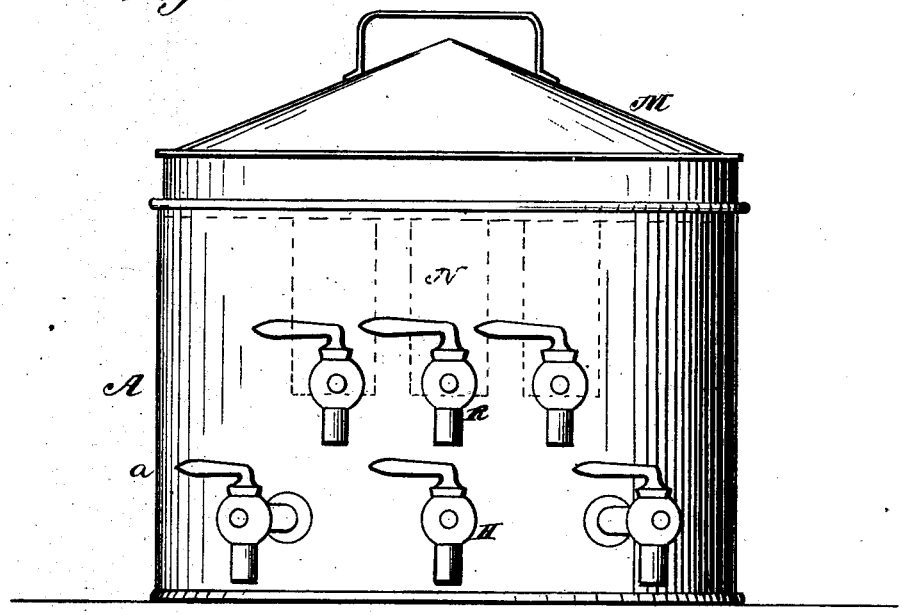
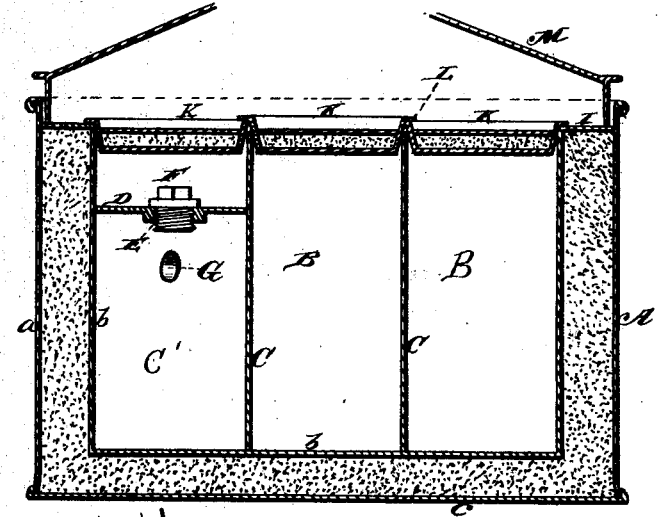
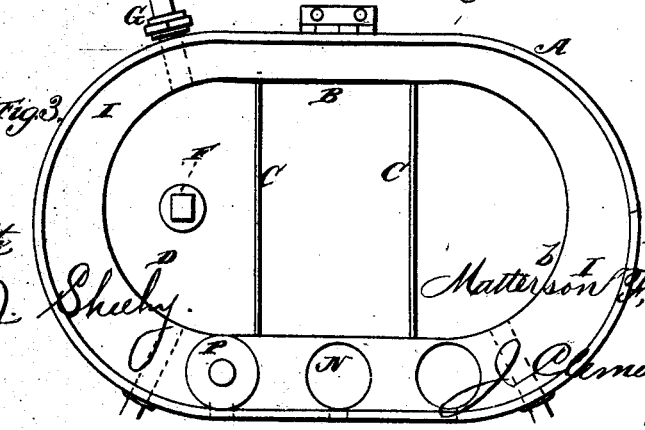

UNITED STATES PATENT OFFICE.

MATTERSON F. CAPPS, OF LONGVIEW, TEXAS.

LIQUID-COOLER.

SPECIFICATION forming part of Letters Patent No. 236,982, dated January 25, 1881.

Application filed July 7, 1880. (No model.)

*To all whom it may concern:*

Be it known that I, MATTERSON F. CAPPS, a citizen of the United States, resident at Longview, in the county of Gregg and State of Texas, have invented certain new and useful Improvements in Liquid-Coolers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its objects to provide an apparatus by means of which a variety of liquids may be simultaneously cooled as required for use as beverages, and by which the glasses or drinking-vessels may be at the same time cooled and protected from dust and insects, the apparatus being especially designed for saloons and other places where beverages are retailed. These objects I attain by the apparatus illustrated in the accompanying drawings, in which—

Figure 1 represents a front view of my improved apparatus entire. Fig. 2 represents a vertical section thereof, and Fig. 3 a top view with the cover removed.

The letter A indicates a vessel, of any suitable size, constructed of sheet metal, with double walls $a$ $b$ and a double bottom, $b$ $c$, the spaces between said walls and bottoms being packed with charcoal, pulverized, or with other poor conductor of heat.

The interior of the casing (indicated by the letter B) is divided into two or more compartments by means of a partition or partitions, C, three of such compartments being illustrated in the present instance. One of said compartments is provided with an air-tight head, D, having an aperture, E, for cleaning, which is closed by a screw-plug, F. The said compartment has also leading to it from the outside a pipe, G, through which liquids, under pressure, may be introduced. The several compartments are provided with stop-cocks H, leading from their lower parts to the outside of the apparatus, by means of which their liquid contents may be drawn off as required for use.

The letter I indicates an annular partition located in the upper part of the vessel A, formed by the outer wall thereof, slightly below the upper edge of the same, which incloses the space between the two walls hermetically at the top.

The various compartments are each provided with a cover, K, consisting of a shallow pan with double bottom and an interposed packing of charcoal or other material, and a flange, L, at the top, by which it is held in place.

The letter M indicates the cover of the apparatus, having a vertical flange at its edge, so that when down a sufficient space will be left above the pans for the reception of glasses or other drinking-vessels, the said cover being hinged at one side to the top of the apparatus.

The letter N indicates a series of sirup-receptacles, located in the space between the double walls of the apparatus, the said vessels being open at their tops and provided with removable covers P. From these vessels or receptacles extend outward the cocks R, by means of which their contents may be drawn off in required quantities.

The operation of my improved apparatus will be readily understood in connection with the above description, and is as follows: The ice is placed in the intermediate compartment with or without water to furnish a supply of cold water for drinking, which may be drawn off through the cock leading from said compartment. The tight compartment at one end of the apparatus is connected to a supply tank or vessel containing liquid under pressure—such as a beer-keg, soda-fount, or the like—and such liquid may be drawn off in required quantities from the cock leading from such compartment. The remaining compartment is intended for ordinary liquids, such as lemonade, cider, or other beverages which are not required to be served under pressure, such liquids being drawn off through the cock of said compartment.

When it is found inconvenient to employ the ordinary soda-water, which consists of water charged with carbonic-acid gas, and which requires to be served under pressure, the soda-water may be prepared from separate solutions, which will generate carbonic-acid gas when intermingled—such, for instance, as a solution of bicarbonate of soda and a solution of tartaric or other innocuous vegetable acid.

In this case the solution of carbonate of soda is placed directly in the ice-chamber, or the other open chamber, and the acid solution is added to the sirup in the sirup-chambers.

By my improvement a limited amount of ice may be employed to cool the various beverages, which is an important item as regards economy; besides, the glasses or drinking-vessels, being secured in the upper part of the apparatus, are kept at a low temperature and out of the way, and are also protected from dust and insects.

Although the invention has been described as particularly designed for saloons, it is evident that it may be employed with advantage in hotels, private families, and other places for general refrigerating purposes, as well as the particular purposes hereinbefore mentioned.

In some cases, in order to add to the non-conducting properties of the walls, the inner sides of the same may be lined with blankets or other fibrous woolen material previous to packing with charcoal, if desired, and to prevent the escape of dregs, lemon-seed, and other solid impurities the apertures leading to the cocks may be provided with foraminous or reticulated partitions, to retain such impurities.

Having thus fully described my invention, what I claim, and desire to secure by Letters Patent, is—

The cooling apparatus herein described, consisting of the vessel A, formed by the walls $a$ and $b$, having non-conducting material intervening, as shown, and made into compartments B B C' by the walls or partitions C, and having the pipe G extending through both walls, the air-tight head D, having aperture E, and screw-pipe F, the covers K, containing non-conducting material, and having resting-flanges, as shown, the whole constructed, arranged, and adapted to serve as and for the purposes set forth.

In testimony whereof I affix my signature in presence of two witnesses.

MATTERSON F. CAPPS.

Witnesses:
D. S. JENNINGS,
B. B. SEVY.